United States Patent
Slaughter

Patent Number: 6,012,841
Date of Patent: Jan. 11, 2000

[54] PERIAPICAL FILM HOLDER

[76] Inventor: Robert C. Slaughter, P.O. Box 6272, Carmel, Calif. 93921

[21] Appl. No.: 09/010,811

[22] Filed: Jan. 22, 1998

[51] Int. Cl.[7] .............. G03B 42/04; A61B 6/14
[52] U.S. Cl. ........................... 378/170; 378/205
[58] Field of Search ................. 378/168, 170, 378/204, 205

[56] References Cited

U.S. PATENT DOCUMENTS

| | | | |
|---|---|---|---|
| 1,698,795 | 1/1929 | Hillman | 378/168 |
| 2,035,051 | 3/1936 | Daly | 378/170 |
| 2,688,096 | 5/1954 | Galliano et al. | 378/168 |
| 3,003,062 | 10/1961 | Updegrave | 378/170 |
| 3,473,026 | 10/1969 | Updegrave | 378/170 |
| 4,295,050 | 10/1981 | Linden | 378/205 |
| 4,731,808 | 3/1988 | Ogunsunlade | 378/170 |
| 4,833,699 | 5/1989 | Gardner, Jr. | 378/168 |
| 4,866,750 | 9/1989 | Chavarria et al. | 378/168 |
| 5,044,009 | 8/1991 | Klauser | 378/170 |
| 5,119,410 | 6/1992 | Donato | 378/170 |
| 5,737,388 | 4/1998 | Kossila | 378/168 |

Primary Examiner—David P. Porta
Assistant Examiner—Drew A. Dunn
Attorney, Agent, or Firm—LaRiviere, Grubman, Payne, LLP

[57] ABSTRACT

A dental x-ray film holder and position device wherein the film holder and an associated biteblock can be rotated 180 degrees relative to a handle and associated x-ray beam alignment aid. Such rotation is facilitated by the use of a knurled knob on the end of an axle. The position of the film holder relative to the handle is determined and fixed by the use of indexing alignment pins on the film holder which fit into corresponding holes in the handle, providing positive positioning in one of two positions.

9 Claims, 1 Drawing Sheet

PERIAPICAL FILM HOLDER

TECHNICAL FIELD

The present invention relates generally to dental film holders and more particularly to methods and apparatus for properly aligning dental film that is positioned in a patient's mouth with an x-ray device external to the patient.

BACKGROUND ART

When taking dental radiographs, it is common to expose more than one film packet for each individual patient. In each exposure for straight-forward dental cavity detection, it is necessary to align the x-ray source in a manner to be perpendicular (orthogonal) to the plane of the recording film to achieve sharp images.

One common technique is to use film packets with an attached flap which the patient clenches between his or her teeth. The x-ray machine operator then estimates the correct angle at which to position the x-ray machine so as to achieve orthogonality. The success of this procedure depends on the skill of the operator and the ability of the patient to retain the film packet in his or her mouth without shifting it from the position the operator believes it to be in.

Another technique is to affix the film packet in an apparatus such as described in U.S. Pat. No. 3,473,026 (Updegrave), which rigidly holds the film packet with respect to a biteblock and an x-ray unit aligning rod upon which is affixed a device for positioning the x-ray unit. The device described in Updegrave is constructed in such a manner so as to position the film packet at a predetermined angular relationship to the axis of the x-ray machine for taking specific exposures suitable for endodontic dental investigations. The device described by Updegrave, however, is not adjustable for positioning the film packet so as to take radiographs of either upper or lower teeth in either the right or left sides of the patient's mouth.

Another device, which provides a means to align a film packet with the axis of an x-ray machine is described in U.S. Pat. No. 4,866,750 (Chavarria, et al.). The six major components of the described device can be manipulated to provide a multitude of angles and positions of the film packet relative to the axis of the x-ray machine. Unfortunately, the device disclosed in Chavarria is complex and cumbersome to readjust so that a variety of exposures of the patient's mouth cannot be made quickly.

Thus, the above-described devices have the common deficiencies of being cumbersome or difficult to readjust for subsequent exposures, composed of multiple pieces which would make them difficult to sterilize, and being costly to manufacture. As recognized by the present invention, however, it is possible to provide a film holder for dental x-rays that is convenient to use and that overcomes the above-noted deficiencies.

Accordingly, it is an object of the present invention to provide a film holder for dental x-rays that can be easily configured for holding film on either side of a patient's mouth. Another object of the present invention is to provide a film holder for dental x-rays that establishes a means for aligning an x-ray machine with dental film in a patient's mouth. Still another object of the present invention is to provide a film holder for dental x-rays that is easy to use and cost effective to manufacture.

Other features of the present invention are disclosed or apparent in the section entitled: "BEST MODE FOR CARRYING OUT THE INVENTION."

DISCLOSURE OF INVENTION

The present invention provides an easily manufactured, disposable film packet holder and biteblock (bite block) associated with an x-ray machine axis alignment aid for use in dental radiographic procedures in any position within the patient's mouth. The present invention can be quickly configured for use in either the left or right, upper or lower portions of the patient's mouth, without the use of tools. To reconfigure the present invention, the operator grasps a convenient knurled knob, presses to disengage the biteblock from the handle by displacing it along a round axle, turns the knob 180 degrees, and retracts the biteblock and associated indexing lock pins into the handle. Positive alignment is achieved by use of two indexing lock pins disposed equidistantly from the axle and which fit into recesses within the handle when the biteblock is correctly positioned. A second embodiment of the present invention utilizes an axle with an oval cross section fitted through an oval opening in the handle, in lieu of the two indexing lock pins, to achieve correct alignment of the biteblock and the handle with the axis alignment aid. The present invention may be manufactured out of any suitable sterilizable plastic material, such as polyvinyl chloride (PVC). The x-ray machine axis alignment aid folds into the handle of the present invention to minimize the storage silhouette.

In another aspect, an intra-oral radiographic rotatable film positioning apparatus includes a biteblock with associated film holding means and indexing lockpin means. Also, the apparatus includes a handle containing a hole passing therethrough, and an axle passing through the handle in the hole and having the biteblock attached on one end and a knurled knob on the distal end.

Preferably, the handle has a pivotable pointer, the pointer being rotatable through an arc of 90 degrees. Moreover, the axle has a circular or oval transverse cross section, and the hole likewise has a circular or oval cross-section to match the cross-section of the axle. Additionally, the indexing lockpin means consists of more than one lock pin.

In yet another aspect, a dental film holder includes a holder configured for securely holding dental x-ray film, and a biteblock affixed to the holder. In accordance with the present invention, the biteblock is configured for clenching between a patient's teeth. A handle is rotatably engaged with the biteblock, such that the biteblock can be moved relative to the handle between a left side engaged position, wherein the biteblock defines a first orientation relative to the handle, and a right side engaged position, wherein the biteblock defines a second orientation relative to the handle. The first orientation is opposite the second orientation, and preferably the first and second orientations are 180° opposed from each other.

In this aspect, the biteblock can be moved to a rotate position, wherein the biteblock is distanced from the handle to facilitate establishing the right side engaged position and the left side engaged position. The film holder preferably further includes an axle protruding from the biteblock and engaged with a hole in the handle. The axle is reciprocatingly received in the hole. A knob is on the axle and is manipulable by a person to move the axle and move the biteblock between the engaged and rotate positions, and to rotate the axle relative to the handle to thereby rotate the biteblock.

At least one lockpin protrudes from the biteblock and at least one recess receives the lockpin to hold the biteblock in a user-selected one of the engaged positions. Advantageously, an elongated index pointer is pivotably engaged with the handle for movement between a housed position, wherein the pointer is parallel to the handle, and an extended position, wherein the pointer is oriented orthogonally to the handle for facilitating alignment of an x-ray device with dental x-ray film in the holder.

In still another aspect, a method is disclosed for taking dental x-rays. The method includes providing a biteblock, holding dental x-ray film generally orthogonal to the biteblock, and rotatably engaging the biteblock with an elongated handle. The biteblock with film is then rotated relative to the handle as appropriate for the desired x-ray. Next, the biteblock is engaged with the handle to prohibit relative motion therebetween, and the film then exposed to x-rays.

The details of the present invention, both as to its structure and operation, can best be understood in reference to the accompanying drawings, in which like reference numerals refer to like parts, and in which:

BRIEF DESCRIPTION OF DRAWINGS

For fuller understanding of the present invention, reference is made to the accompanying drawing in the following detailed description of the Best Mode of Carrying Out the Present Invention. In the drawings.

Figure 1:
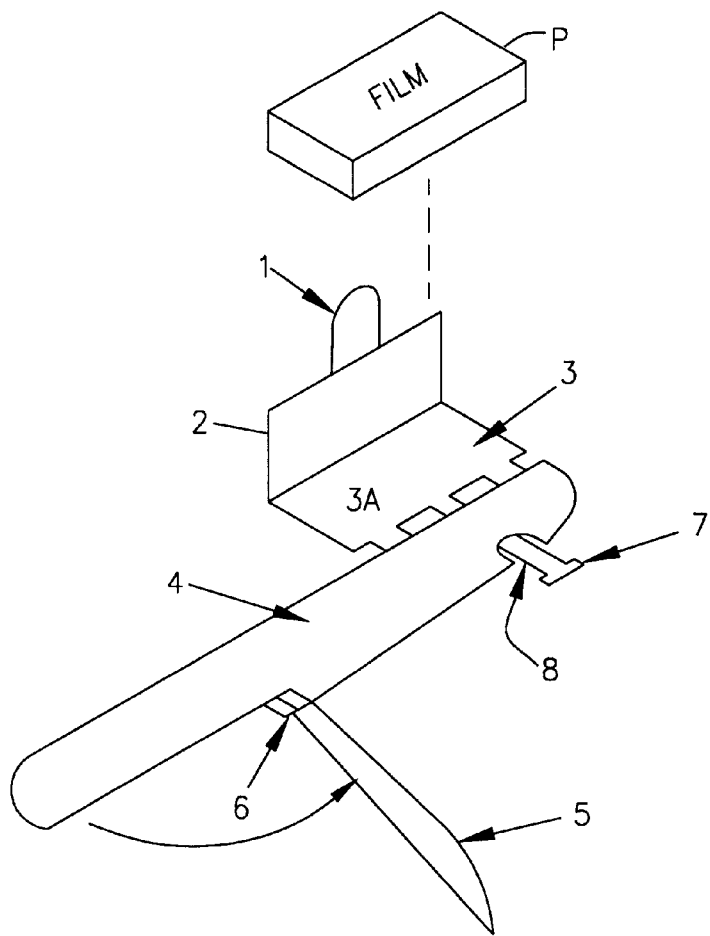
FIG. 1 is a perspective view of the film holder of the present invention, in an exploded relationship to a piece of dental film, with the pointer in the extended position and with the bite block in the engaged position.

Reference numbers refer to the same or equivalent parts of the present invention throughout the several figures of the drawing.

BEST MODE FOR CARRYING OUT THE INVENTION

Referring initially to FIG. 1, a biteblock 3 is movably attached to handle 4. Biteblock 3 consists of a flat surface 3A to be gripped between the patient's teeth, coupled with a back plate 1 and front plate 2 disposed along a rear edge of bite block 3 for receiving and holding a film packet "P" between the plates 1, 2, generally orthogonal to flat surface 3A of biteblock 3. It is to be understood that one or both of the plates 1, 2 can alternatively be a plastic frame.

Biteblock 3 is rotatably engaged with handle 4 by means of axle 8 which terminates in knurled knob 7. Axle 8 is oval or circular in transverse cross-section, and axle 8 is terminated on one end by biteblock 3 and on the other end by knurled knob 7. As shown in FIG. 1, axle 8 passes through an oval or round opening 11 that is formed in handle 4.

In the preferred embodiment, biteblock 3 is stationary with respect to axle 8, and may be affixed to axle 8 by heat staking, RF sealing, ultrasonic welding or solvent bonding. Alternatively, axle 8 can be formed integrally with biteblock 3. Or, biteblock 3 can be removably attached to biteblock 8, such as by a friction fit.

Figure 2:
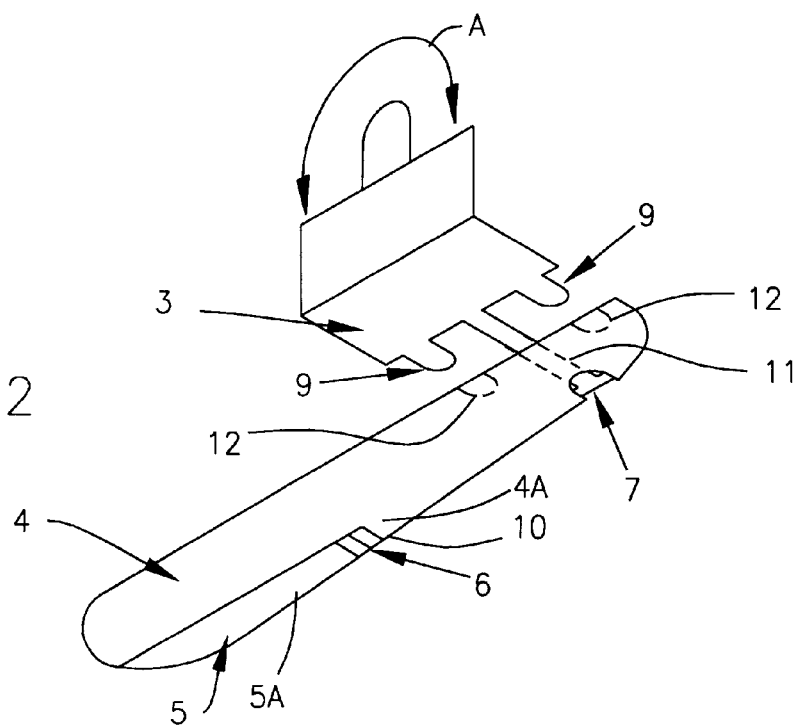
FIG. 2 is a perspective view of the film holder with the biteblock in the rotate position and the pointer in the housed position, and with the lockpin recesses in the handle shown in phantom.

In either case, knurled knob 7 may be manipulated by a user of the invention to move biteblock 3 from an engaged position, shown in FIG. 1, in which biteblock 3 does not move relative to handle 4, to a rotate position, shown in FIG. 2, in which biteblock 3 is distanced from handle 4 such that a user can manipulate knob 7 to rotate biteblock relative to handle 4, as indicated by the arrows "A" in FIG. 2.

Thus, FIG. 2 shows biteblock 3 displaced from handle 4 along axle 8 so that biteblock 3 can be rotated relative to handle 4. As shown best in FIG. 2, two indexing lockpins 9 are exposed in the rotate position. When biteblock 3 is rotated to the desired position, a user can manipulate knob 7 to move biteblock 3 back to the engaged position. It may now be appreciated that in the engaged position, biteblock 3 is secured in position by the cooperation of structure between indexing lockpins 9 and recesses 12 within handle 4, into which lockpins 9 are closely received. Per the present invention, indexing lockpins 9 are equidistantly disposed from axle 8 so that the recesses 12 within handle 4 will receive lockpins 9 whether biteblock 3 is oriented in the position shown in FIG. 1 or in an engaged position in which biteblock 3 has been rotated 180° from the orientation shown in FIG. 1.

Axis pointer 5 moves through an arc of 90 degrees around pivot pin 6, relative to handle 4, as can be appreciated in cross-reference to FIGS. 1 and 2. More specifically, a user can grasp pointer 5 and move it from a housed position, shown in FIG. 2, wherein the long axis of pointer 5 is parallel to the long axis of handle 4 and surface 5A of pointer 5 is flush with surface 4A of handle 4, to an extended position shown in FIG. 1, wherein the long axis of pointer 5 is oriented orthogonally to the long axis of handle 4. Shoulder 10 in handle 4 bears upon axis pointer 5 in the fully extended position, restricting the movement of pointer 5. Consequently, in the extended position pointer 5 is orthogonal to back plate 1 and front plate 2, and thus is orthogonal to film packet P when inserted between the plates 1, 2, when axis pointer 5 is in use.

With the above-described combination of structure, biteblock 3 can be moved to the rotate position and then rotated about axle 8 to the desired left side or right side orientation by rotating the knob 7 as indicated by arrows "A" in FIG. 2. Then, the knob 7 can be further manipulated to translationally move biteblock 3 relative to handle 4 back to a left side engaged position (shown in FIG. 1) or a right side engaged position in which the biteblock 3 is oriented 180° opposite the orientation shown in FIG. 1. Next, pointer 5 is moved to the extended position, for use as a guide in aligning the invention with an x-ray machine, such that film P is orthogonal to the beam of the x-ray machine. An x-ray can then be taken to expose film P, and biteblock 3 removed from the patient's mouth to provide access to film P. Pointer 5 is then moved back to the housed position to minimize interference between pointer 5 and other objects.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims, in which reference to an element in the singular is not intended to mean "one and only one" unless explicitly so stated, but rather "one or more". The inventions illustratively disclosed herein may be practiced without any element which is not specifically disclosed herein.

What is claimed is:

1. An intra-oral radiographic rotatable film positioning apparatus comprising:
   a) A biteblock with associated film holding means and indexing lockpin means;
   b) A handle containing a hole passing therethrough; and
   c) An axle passing through said handle in said hole and having said biteblock attached on one end and a knurled knob on the distal end.

2. An apparatus as claimed in claim 1 wherein said handle has a pivotable pointer, said pointer being rotatable through an arc of 90 degrees.

3. An apparatus as claimed in claim 1 wherein said axle has a circular cross section.

4. An apparatus as claimed in claim 1 wherein said indexing lockpin means consists of more than one lock pin.

5. An apparatus as claimed in claim 1 wherein said axle has an oval cross section.

6. An apparatus as claimed in claim 5 wherein said hole has an oval cross section.

7. A dental film holding device, comprising:

a holder configured for securely holding dental x-ray film;

a biteblock affixed to the holder, the biteblock being configured for clenching thereof between a patient's teeth; and a handle rotatably engaged with the biteblock, wherein the biteblock can be moved relative to the handle between a left side engaged position, wherein the biteblock defines a first orientation relative to the handle, and a right side engaged position, wherein the biteblock defines a second orientation relative to the handle, the first orientation being opposite the second orientation, wherein the biteblock can be moved to a rotate position, wherein the biteblock is distanced from the handle to facilitate establishing the right side engaged position and the left side engaged position, and wherein the film holding device further comprises:

an axle protruding from the biteblock and engaged with a hole in the handle, the axle being reciprocatingly received in the hole; and a knob on the axle and manipulable by a person to move the axle and move the biteblock between the engaged and rotate positions, and to rotate the axle relative to the handle to thereby rotate the biteblock.

8. The film holding device of claim 7, further comprising at least one lockpin protruding from the biteblock and at least one recess for receiving the lockpin to hold the biteblock in a user-selected one of the engaged positions.

9. The film holding device of claim 7, further comprising an elongated index pointer pivotably engaged with the handle for movement between a housed position, wherein the pointer is parallel to the handle, and an extended position, wherein the pointer is oriented orthogonally to the handle for facilitating alignment of an x-ray device with dental x-ray film in the holder.

\* \* \* \* \*